(12) United States Patent
Hirao

(10) Patent No.: US 7,930,818 B2
(45) Date of Patent: Apr. 26, 2011

(54) STATOR MOUNTING METHOD

(75) Inventor: Yasuyuki Hirao, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 283 days.

(21) Appl. No.: 12/401,103

(22) Filed: Mar. 10, 2009

(65) Prior Publication Data

US 2009/0230793 A1    Sep. 17, 2009

(30) Foreign Application Priority Data

Mar. 12, 2008    (JP) ................................. 2008-062362

(51) Int. Cl.
*H02K 11/00*   (2006.01)
*H01F 5/00*   (2006.01)

(52) U.S. Cl. ............... 29/605; 29/606; 310/71; 310/194

(58) Field of Classification Search ............... 310/71, 310/194; 29/605, 606, 598, 596
See application file for complete search history.

(56) References Cited

U.S. PATENT DOCUMENTS

| | | | |
|---|---|---|---|
| 7,091,645 B2* | 8/2006 | Yoneda et al. | 310/208 |
| 7,795,767 B2* | 9/2010 | Ueta et al. | 310/71 |
| 2008/0136286 A1* | 6/2008 | Hiramatsu et al. | 310/216 |

FOREIGN PATENT DOCUMENTS

| | | | | |
|---|---|---|---|---|
| JP | 2005-130665 A | | 5/2005 | |
| JP | 2007-215356 A | | 8/2007 | |
| JP | 2007215356 A | * | 8/2007 | |

* cited by examiner

*Primary Examiner* — Burton Mullins
*Assistant Examiner* — Leda Pham
(74) *Attorney, Agent, or Firm* — Kenyon & Kenyon LLP

(57) ABSTRACT

In a stator mounting method in which a coil unit is inserted into a stator core and a lead wire protruding from the coil unit is inserted into and mounted on a terminal portion of the stator core, the lead wire is passed through a lead wire pullout portion located at a predetermined position of a coil frame body, a height from an inner peripheral upper face of the coil frame body to the lead wire pullout portion is equalized with a distance from a core upper face of the stator core to a lead wire insertion position inner peripheral lower face of the terminal portion, and the core upper face of the stator core is held in contact with an inner peripheral upper face of the coil frame body after the lead wire is inserted into the terminal portion.

2 Claims, 11 Drawing Sheets

STATOR MOUNTING METHOD

INCORPORATION BY REFERENCE

The disclosure of Japanese Patent Application No. 2008-062362 filed on Mar. 12, 2008 including the specification, drawings and abstract is incorporated herein by reference in its entirety.

BACKGROUND OF THE INVENTION

1. Field of the Invention

The invention relates to an art of mounting a concentrated winding coil unit on a stator of a motor, and to an art of making an improvement in automatic assembly properties.

2. Description of the Related Art

In recent years, as is the case with hybrid vehicles, the number of cases in which a large motor used for driving is mounted on a vehicle has been increasing. In a stator employed in such an on-vehicle motor, a plurality of concentrated winding coil units, with coils wound therearound, are fitted on a stator core. Coil terminals provided on the concentrated winding coil units are inserted into end terminals on a wire connection terminal side provided on the stator, and are connected thereto respectively by a caulking finishing machine or the like.

In the case where the concentrated winding coil units as described above are mounted on the stator to manufacture the motor, there is a problem of the inferiority in automatic assembly properties. Studies have recently been conducted also on arts of making an improvement in such automatic assembly properties. An art regarding a method of manufacturing a motor with high automatic assembly properties is disclosed in Japanese Patent Application Publication No. 2007-215356 (JP-A-2007-215356). While a coil unit is inserted into an end terminal of a wire connection terminal, a coil terminal is guided by a guide member. The guide member is equipped with a floating mechanism, and can be freely positioned. A pair of guide-equipped chuck members coupled to an air cylinder sandwich the end terminal, and the coil terminal, which is guided by the guide member, is inserted.

In manufacturing the concentrated winding coil unit, the concentrated winding coil unit is designed such that the coil terminal is more or less accurately positioned. However, due to a construction in which a lead wire is pulled out from the coil unit, there is a limit to the enhancement of the accuracy. Thus, the guide member is equipped with the floating mechanism to make it possible to absorb the dispersion in a lateral direction. By using the guide member equipped with the floating mechanism to assemble the stator as described above, an improvement in automatic assembly properties in assembling the coil unit with the stator can be achieved.

However, the art disclosed in Japanese Patent Application Publication No. 2007-215356 (JP-A-2007-215356) is considered to have the following problem. In the art disclosed in Japanese Patent Application Publication No. 2007-215356 (JP-A-2007-215356), the guide member is equipped with the floating mechanism to cope with the lateral dispersion of lead wire protruding from the coil unit. However, the lead wire disperses not only in the lateral direction but also in a vertical direction. It is difficult to absorb this dispersion with the aforementioned construction.

Originally, tight restrictions are imposed on the dimension of the on-vehicle motor, and it is desirable to form the on-vehicle motor in a size as small as possible. Thus, in connecting the coil unit to a bus bar provided on the stator core, the lead wire protruding from the coil unit and the end terminal formed on the bus bar tend to be formed in a small size. This reduction in the size of the motor leads to a deterioration in the assembly properties in assembling the coil unit with the stator core, and constitutes a limiting factor for automation. In particular, the mounting of the lead wire protruding from the coil unit on the end terminal is likely to cause dispersion and hence gives rise to a problem. It is possible to reduce the dispersion in the lateral direction by providing the floating mechanism laterally movably as disclosed in Japanese Patent Application Publication No. 2007-215356 (JP-A-2007-215356). However, since there is only a small room in the vertical direction, it is difficult to ensure a clearance for absorbing dispersion through the method disclosed in Japanese Patent Application Publication No. 2007-215356 (JP-A-2007-215356).

SUMMARY OF THE INVENTION

The invention provides a stator mounting method capable of absorbing the dispersion of a lead wire of a concentrated winding coil unit to make an improvement in automatic mounting properties.

A first aspect of the invention relates to a stator mounting method in which a concentrated winding coil unit formed by winding a conductor wire around a frame body in advance is inserted into a stator core formed of laminated steel plates, and a lead wire protruding from the concentrated wiring coil unit is inserted into and mounted on a terminal portion provided on the stator core. In this stator mounting method, the lead wire is passed through a lead wire pullout portion located at a predetermined position of the frame body, a height from an inner peripheral face of the frame body to the lead wire pullout portion is equalized with a distance from an upper face of a frame body insertion portion of the stator core to a lead wire insertion position inner peripheral lower face of the terminal portion, and the upper face of the frame body insertion portion of the stator core is held in contact with an upper side of the inner peripheral face of the frame body after the lead wire is inserted into the terminal portion following a start of insertion of the frame body into the stator core.

In the stator mounting method according to the first aspect of the invention, the frame body may be pressed, when being inserted into the stator core, against the upper face side of the frame body insertion portion of the stator core with an aid of pressurization means to hold the upper face of the frame body insertion portion of the stator core in contact with the upper side of the inner peripheral face of the frame body.

If the height from the inner peripheral face of the frame body to the lead wire pullout portion is set equal to the distance from the upper face of the frame body insertion portion of the stator core to the lead wire insertion position inner peripheral lower face of the terminal portion, the height of the lead wire is made substantially equal to the height of the terminal portion by holding the upper face of the frame body insertion portion of the stator core in contact with the upper side of the inner peripheral face of the frame body after the lead wire is inserted into the terminal portion following the start of insertion of the frame body into the stator core. As a result, the dispersion of a mounting position is reduced. When the concentrated winding coil unit is mounted on the stator core according to the related art, no consideration is given to the mounting of the lead wire on the terminal portion as described above. Therefore, an improvement in mounting properties and a reduction in the number of rejects can be expected by adopting a construction in which the heights of the lead wire and the terminal portion are constant as described above. Accordingly, it is possible to provide a stator mounting method capable of absorbing the dispersion of a lead wire of a concentrated winding coil unit to make an improvement in automatic mounting properties.

According to the foregoing aspect of the invention, the frame body can be reliably pressed against the upper face of the frame body insertion portion of the stator core by the pressurization means, and the lead wire can be accurately mounted on the terminal portion. The operation of inserting the frame body into the stator core is under many restrictions, and structurally has almost no room for the use of a guide jig or the like. However, a reduction in dispersion can be expected simply by pressing the frame body or the coil unit against the stator core with the aid of the pressurization means. Therefore, this method is adoptable even at a location under many restrictions in terms of space.

BRIEF DESCRIPTION OF THE DRAWINGS

The foregoing and further objects, features and advantages of the invention will become apparent from the following description of an example embodiment with reference to the accompanying drawings, wherein like numerals are used to represent like elements and wherein.

DETAILED DESCRIPTION OF EMBODIMENT

Figure 1:
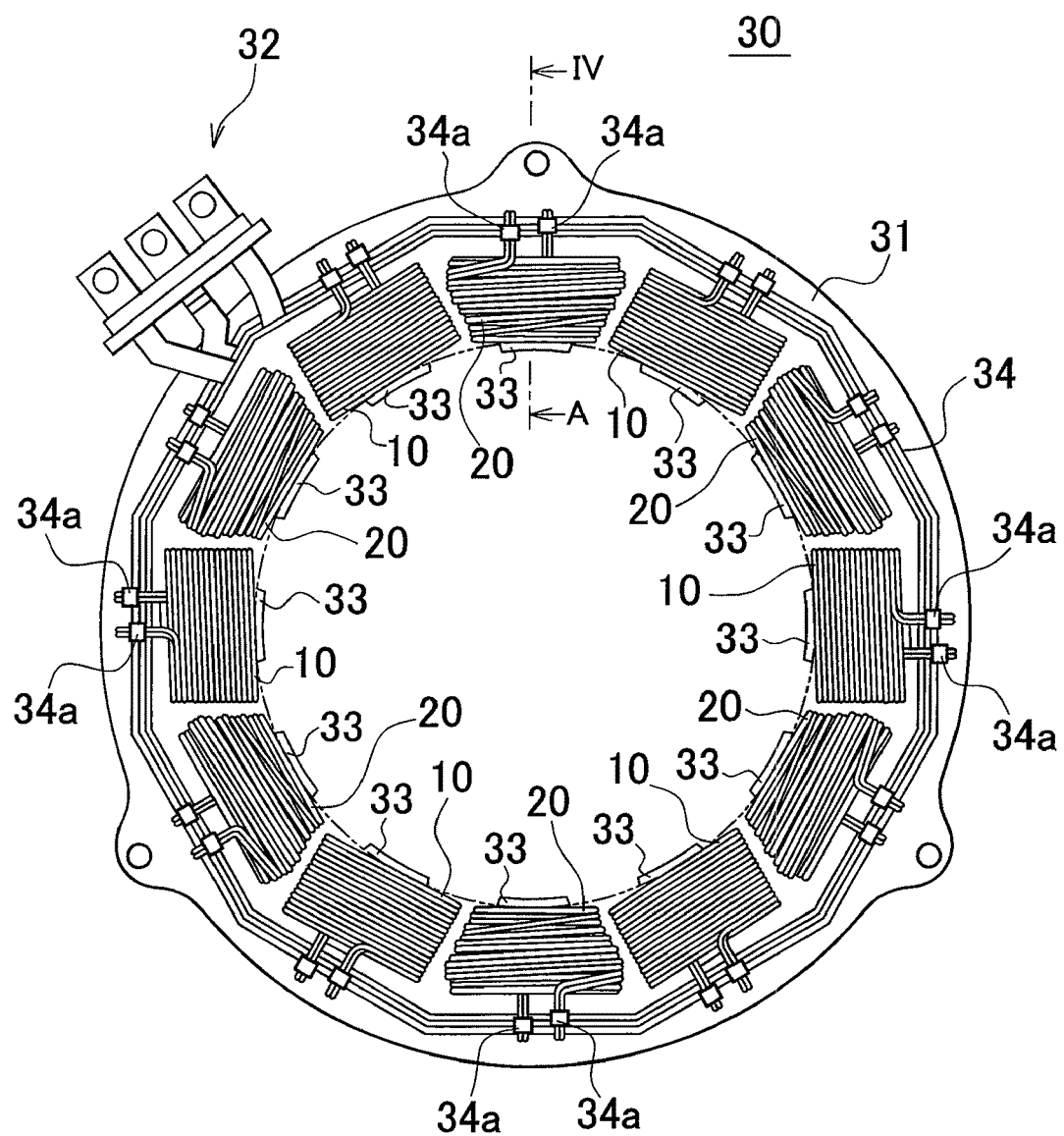
FIG. 1 is a top view of a stator according to this embodiment of the invention.

A stator mounting method according to the invention will be described with reference to the drawings. FIG. 1 is a top view of the stator according to this embodiment of the invention. A stator 30 is manufactured by alternately inserting rectangular coil units 10 and tapered coil units 20 into a stator core 31 formed of laminated steel plates. The rectangular coil units 10 and the tapered coil units 20 are concentrated winding coil units. The stator core 31 is formed by cylindrically laminating the laminated steel plates, and is provided on an inner peripheral side thereof with a plurality of convex teeth portions 33. The rectangular coil units 10 and the tapered coil units 20 are alternately inserted into these teeth portions 33.

Figure 2:
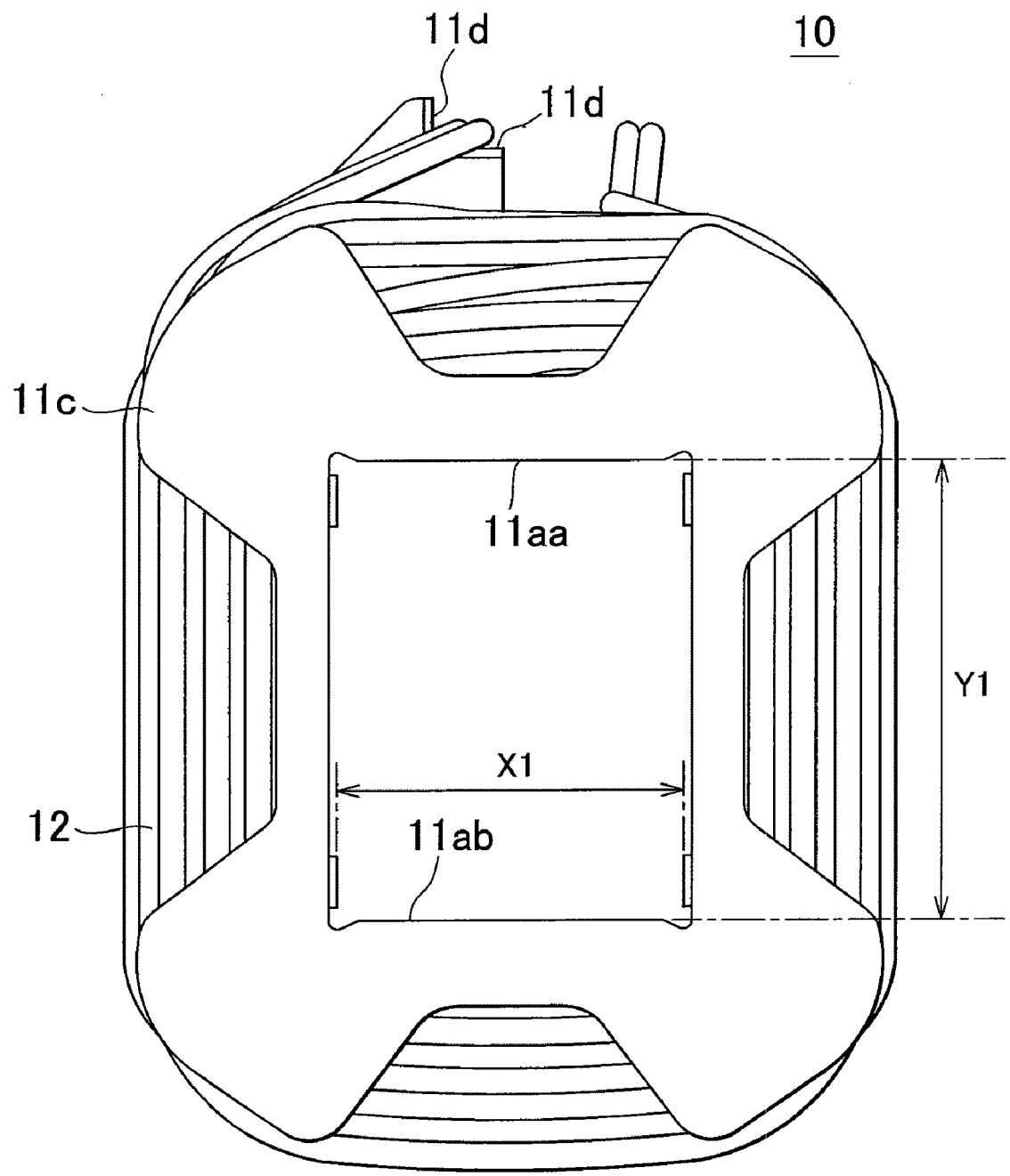
FIG. 2 is a plan view of each rectangular coil unit according to this embodiment of the invention, as viewed from an inner periphery side of a stator core when mounted on the stator core.
Figure 3:
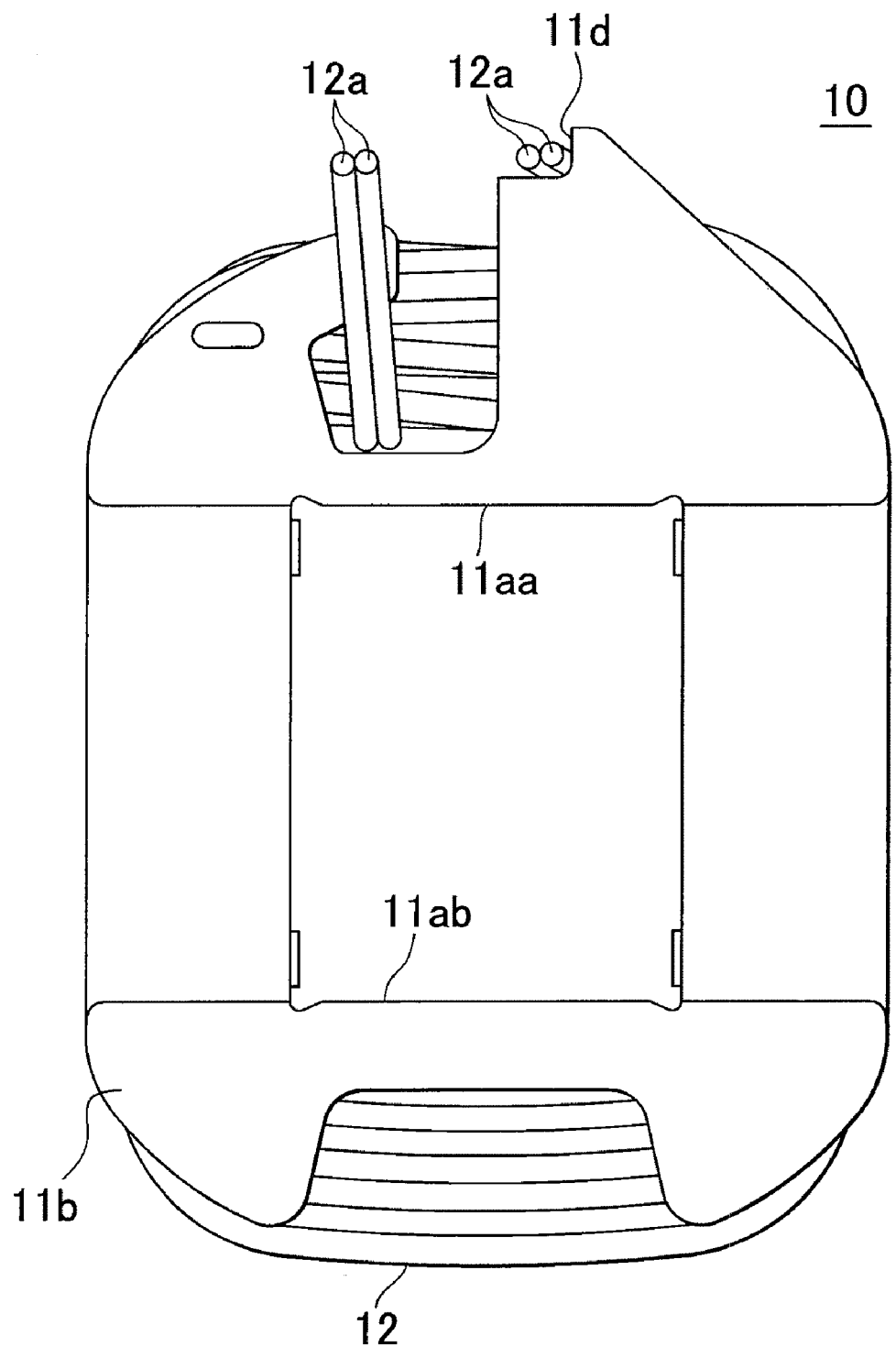
FIG. 3 is a plan view of each rectangular coil unit according to this embodiment of the invention, as viewed from an outer periphery side of the stator core when mounted on the stator core.
Figure 4:
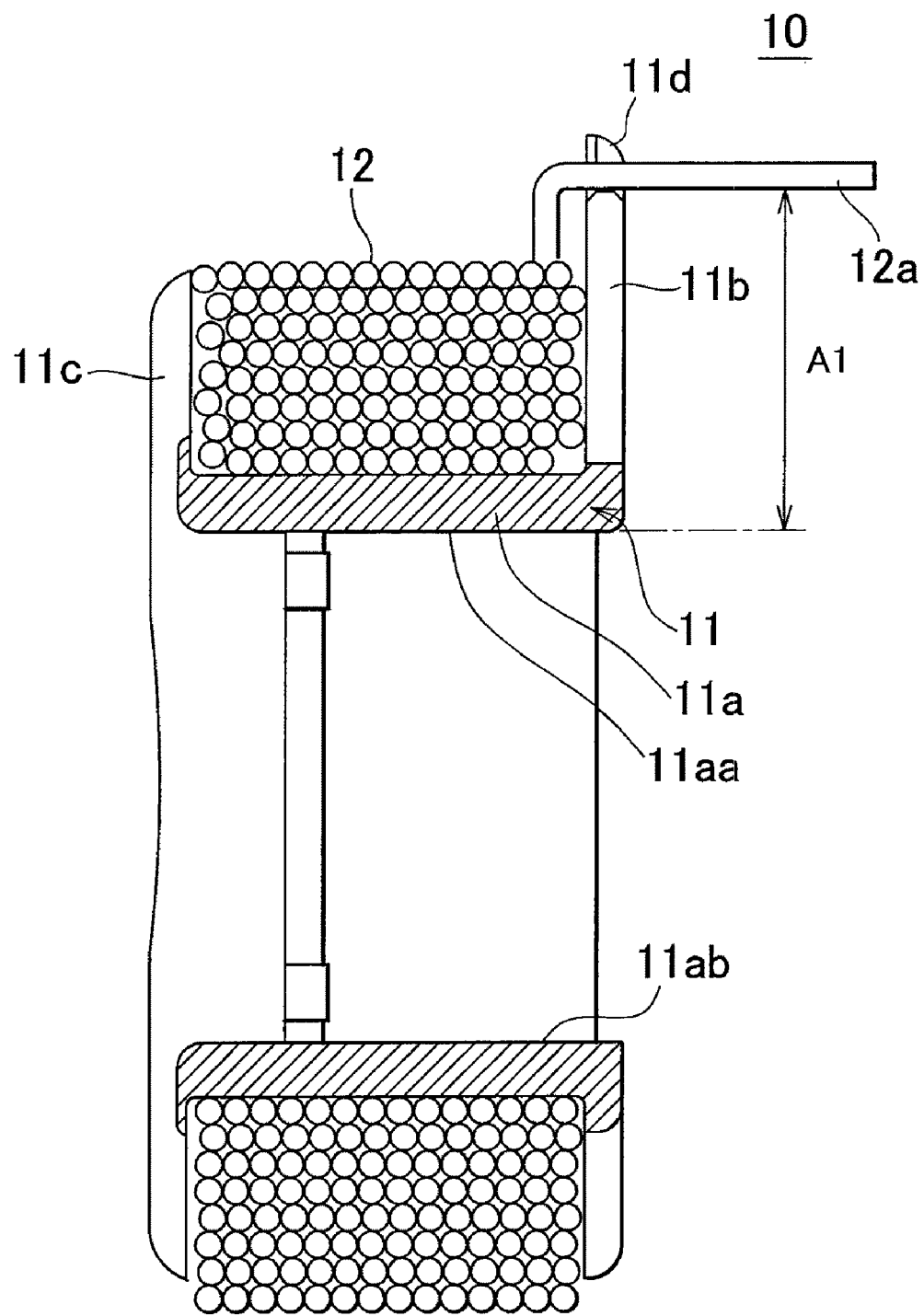
FIG. 4 is a sectional view of each rectangular coil unit according to this embodiment of the invention.

FIG. 2 is a plan view of each of the rectangular coil units 10 as viewed from an inner periphery side of the stator core 31 when mounted on the stator core 31. FIG. 3 is a plan view of each of the rectangular coil units 10 as viewed from an outer periphery side of the stator core 31 when mounted on the stator core 31. FIG. 4 is a lateral sectional view of each of the rectangular coil units 10. FIG. 4 is a sectional view taken along a line IV-IV shown in FIG. 1. Each of the rectangular coil units 10 is formed by winding a conductor wire 12 around a rectangular coil frame body 11. The rectangular coil frame body 11 is formed of an insulating resin. The conductor wire 12 is a wire material subjected to insulating coating in advance. A material obtained by subjecting copper or aluminum to enamel coating or the like can be exemplified as a material for the conductor wire 12.

The rectangular coil frame body 11 has a frame-like body 11a on which an inner wall portion 11b and an outer wall portion 11c are formed. As shown in FIG. 4, the rectangular coil frame body 11 is formed such that an outer periphery thereof is bent back outward into the shape of U with the body 11a, the inner wall portion 11b, and the outer wall portion 11c. The conductor wire 12 is wound around this U-shaped groove. As shown in FIGS. 2 and 3, a lead wire pullout portion 11d for determining a height of a lead wire 12a pulled out from the conductor wire 12 is formed on the inner wall portion 11b provided on the rectangular coil frame body 11.

The lead wire 12a is pulled out at two locations from each of the rectangular coil units 10. A lead wire height A1 of the lead wire 12a is determined by the lead wire pullout portion 11d. This lead wire 12a is connected to a bus bar 34 provided on one of end faces of the stator core 31. The bus bar 34 is employed to form a circuit of the rectangular coil units 10 using the rectangular coil units 10 and the tapered coil units 20. The bus bar 34 is connected to each lead wire 12a by a corresponding one of terminal portions 34a protrusively provided on an upper face of the bus bar 34.

Figure 5:
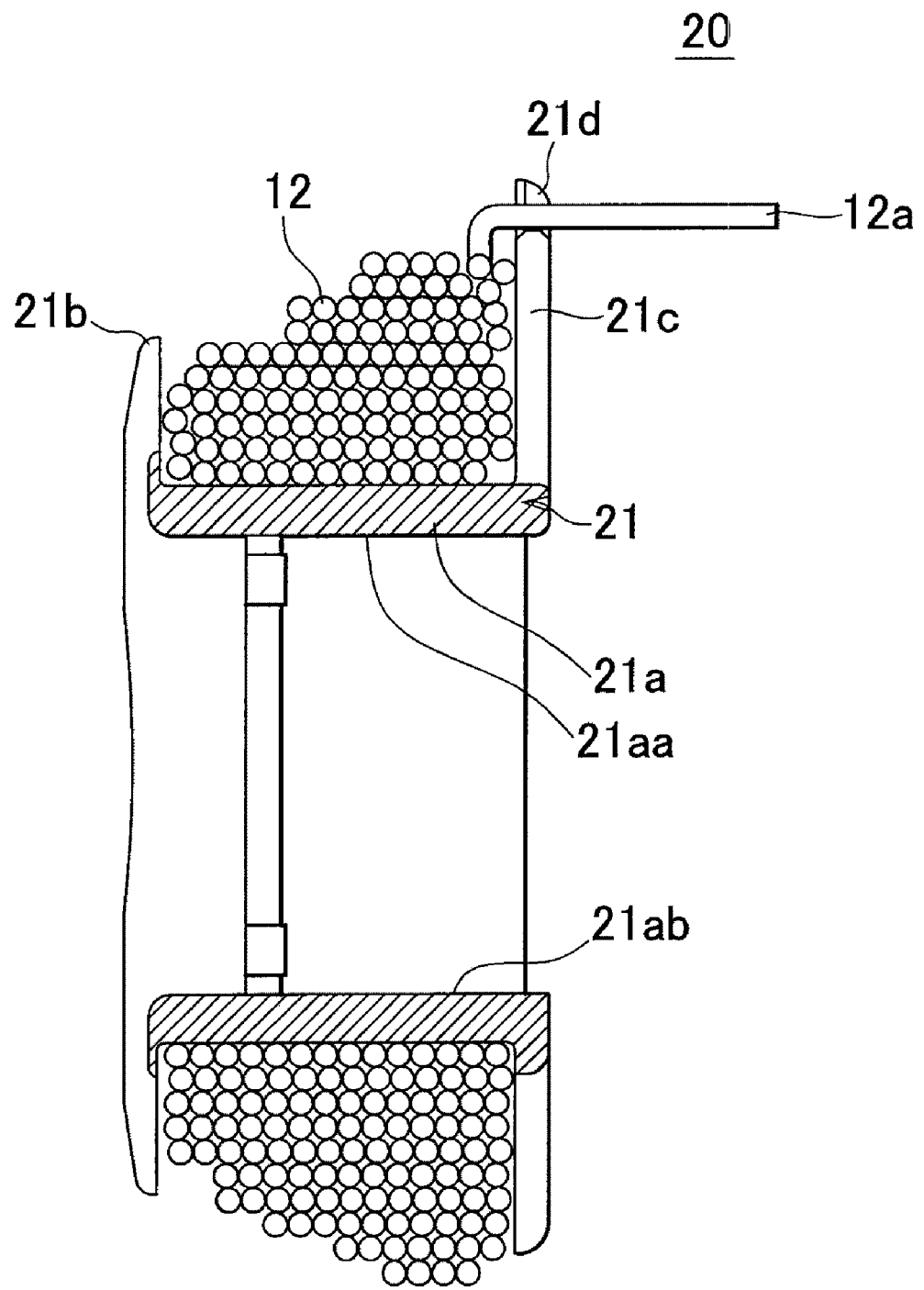
FIG. 5 is a sectional view of each tapered coil unit according to this embodiment of the invention.

FIG. 5 is a sectional view of each of the tapered coil units 20. The tapered coil unit 20 is substantially identical in construction to the rectangular coil unit 10. However, the tapered coil unit 20 is different from the rectangular coil unit 10 in that the conductor wire 12 is so wound around a tapered coil frame body 21 as to be high on an outer wall portion 21c side and low on an inner wall portion 21b side. A body 21a is substantially identical in shape to the body 11a, and the outer wall portion 21c is provided with a lead wire pullout portion 21d. As is the case with each of the rectangular coil units 10, the lead wire height of the lead wire 12a is determined by the height of the lead wire pullout portion 21d. The rectangular coil units 10 and the tapered coil units 20 are alternately inserted into the teeth portions 33 of the stator core 31 to form the stator 30.

Figure 6:
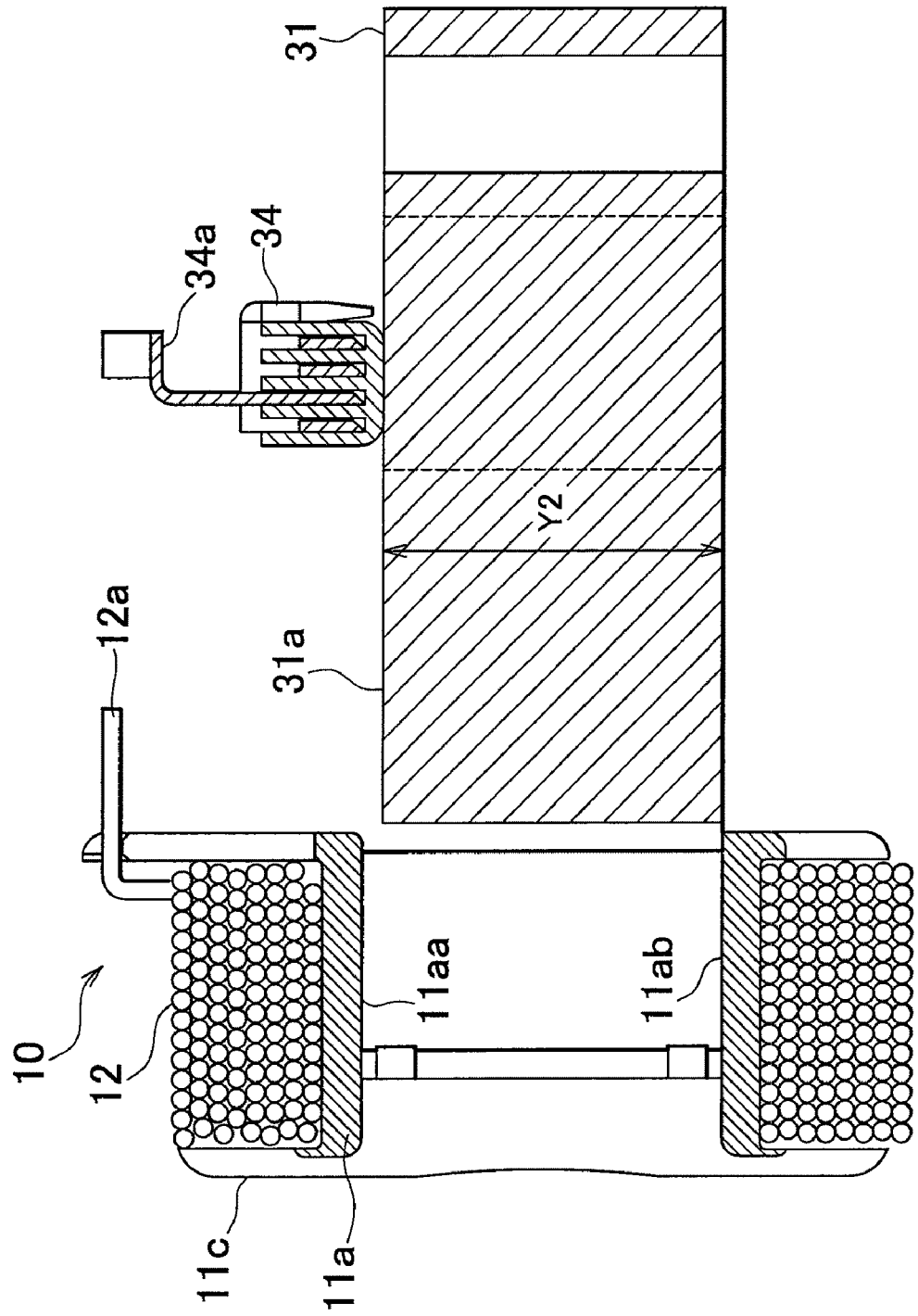
FIG. 6 is a schematic sectional view showing a state in which each rectangular coil unit has not been inserted into the stator core in this embodiment of the invention.
Figure 7:
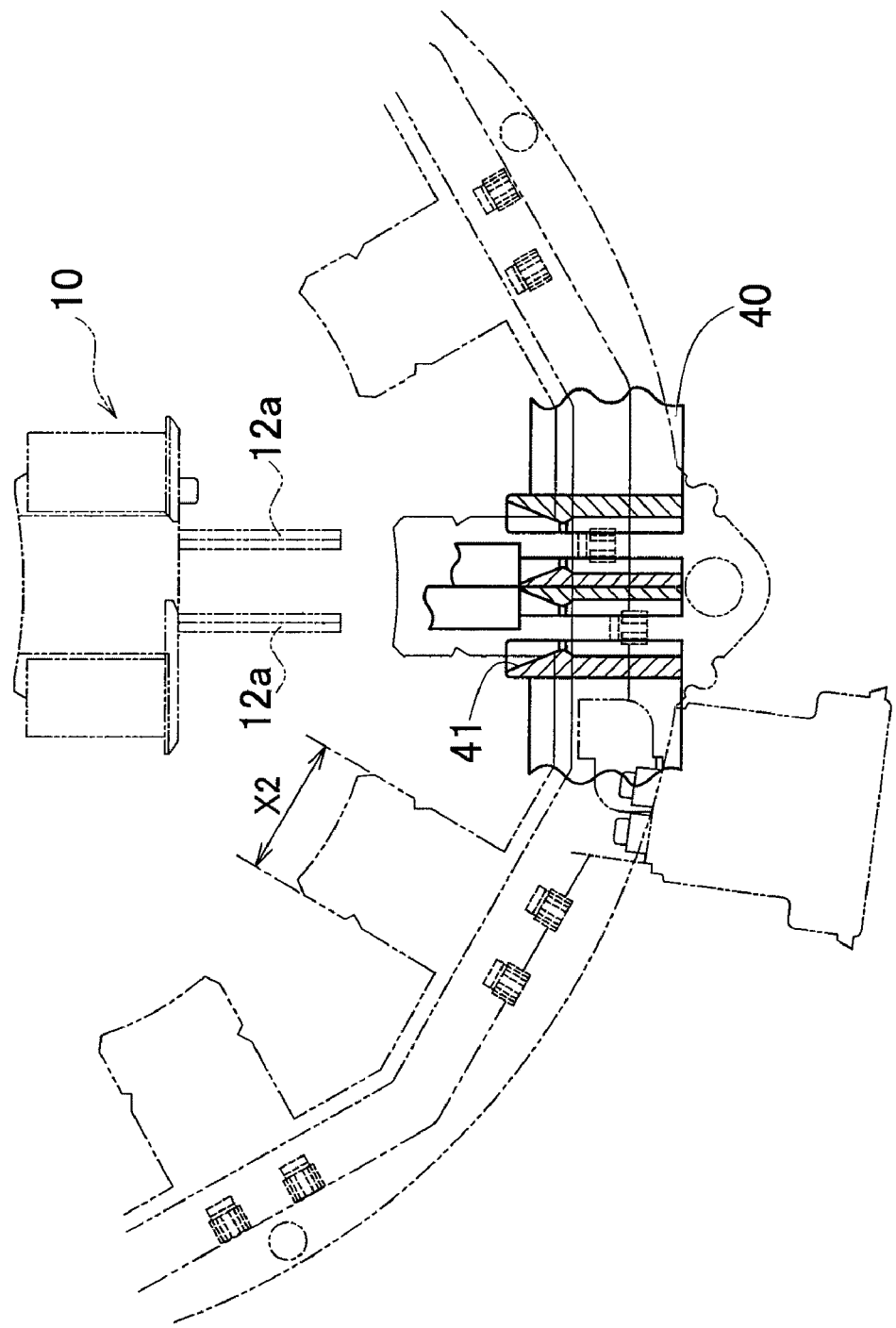
FIG. 7 is a schematic plan view showing a state in which each rectangular coil unit has not been inserted into the stator core in this embodiment of the invention.
Figure 8:
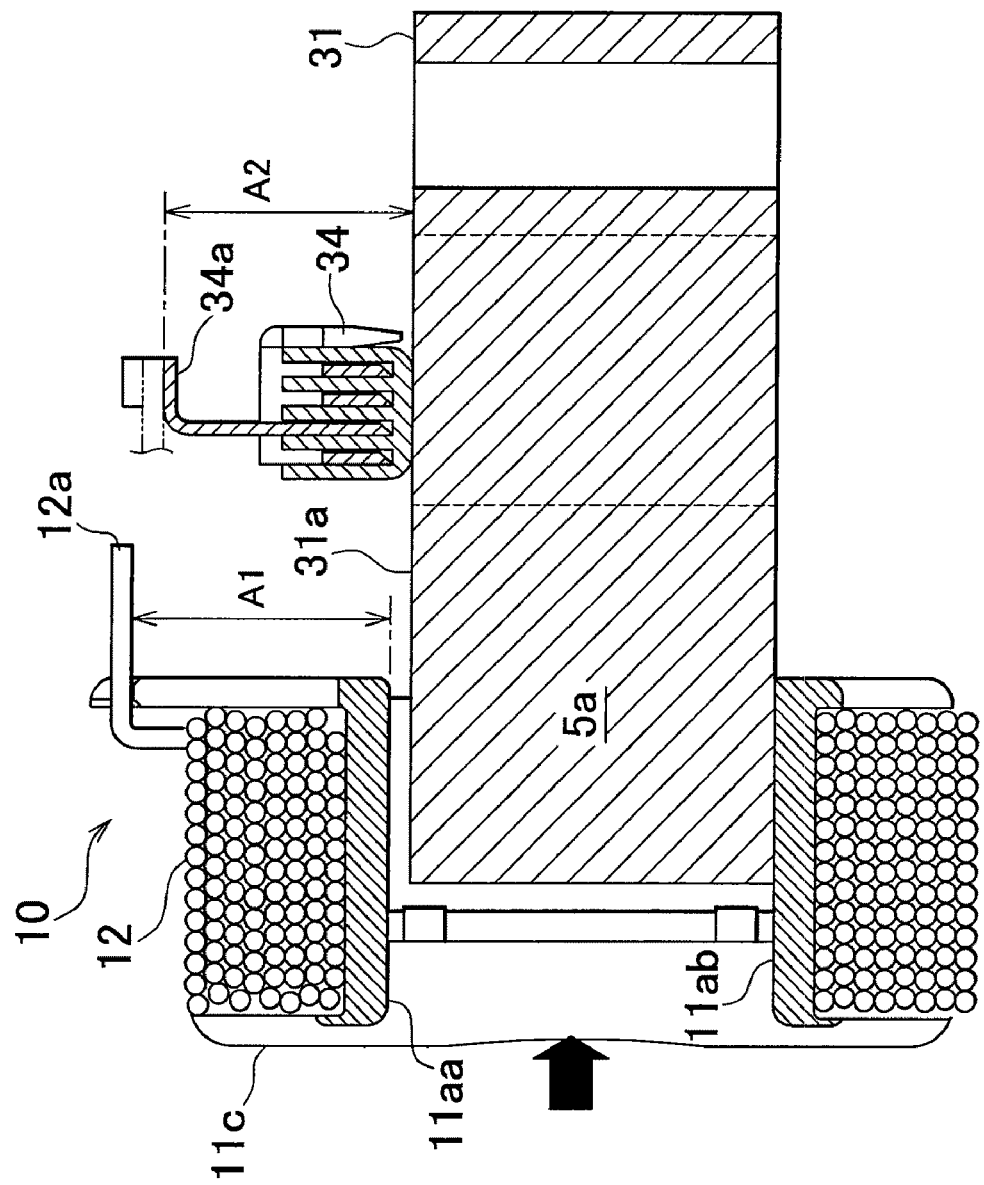
FIG. 8 is a schematic sectional view showing a state in which each rectangular coil unit is being inserted into the stator core in this embodiment of the invention.
Figure 9:
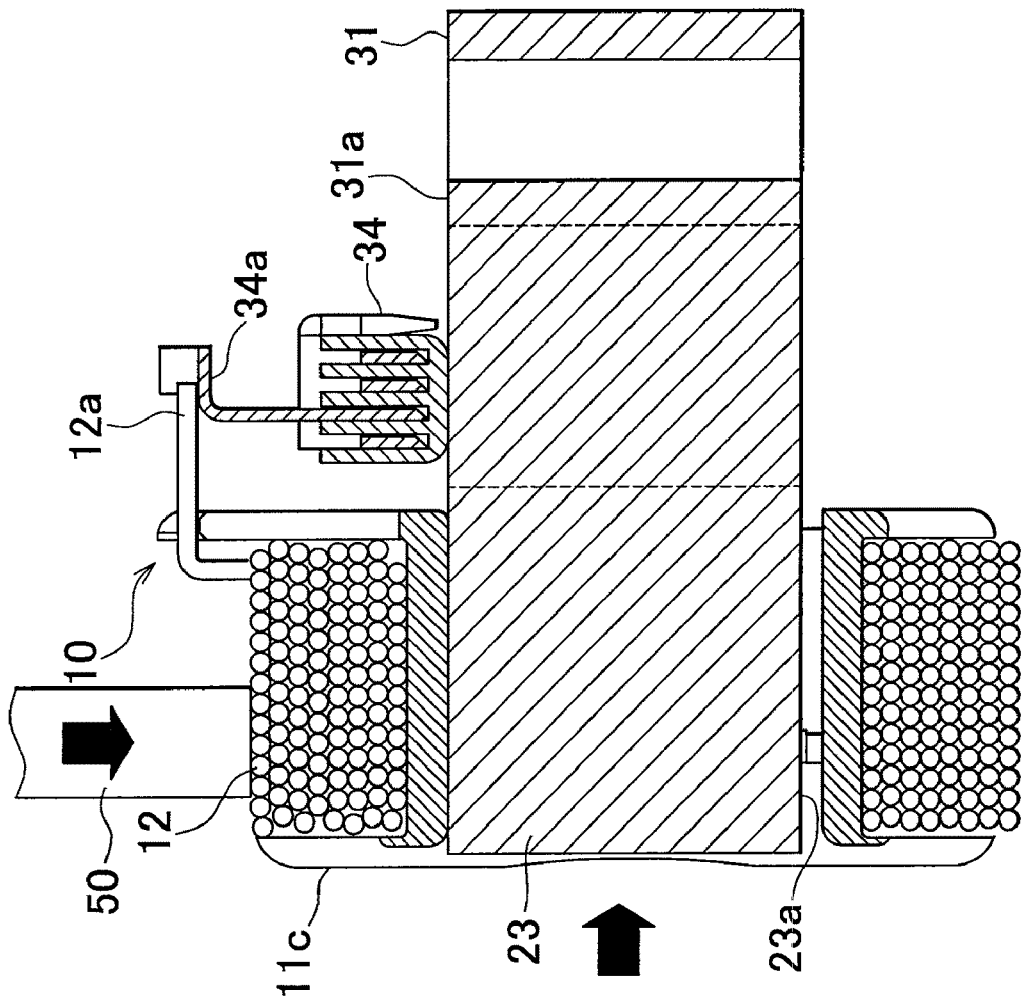
FIG. 9 is a schematic sectional view showing a state in which each rectangular coil unit is being inserted into the stator core and a lead wire has just begun to be inserted into a terminal portion in this embodiment of the invention.
Figure 10:
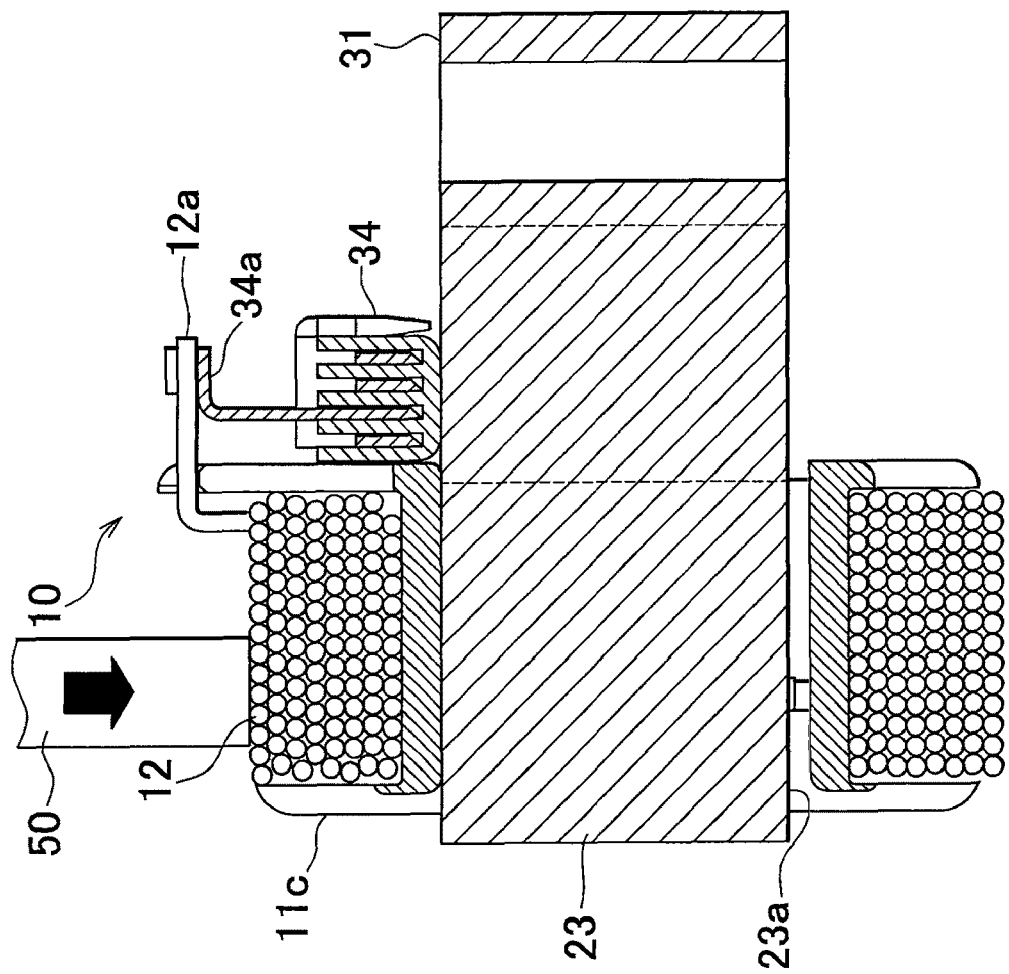
FIG. 10 is a schematic sectional view showing a state in which each rectangular coil unit has been inserted into the stator core in this embodiment of the invention.

The mounting of the rectangular coil units 10 and the tapered coil units 20 on the stator core 31 will be carried out according to a procedure described below. FIG. 6 is a schematic sectional view showing a state in which the rectangular coil unit 10 has not been inserted into the stator core 31. FIG. 7 is a schematic plan view showing a state in which the rectangular coil unit 10 has not been inserted into the stator core 31. FIG. 8 is a schematic sectional view showing a state in which the rectangular coil unit 10 is being inserted into the stator core 31. FIG. 9 is a schematic sectional view showing a state in which the rectangular coil unit 10 is being inserted into the stator core 31 and the lead wire 12a has just begun to be inserted into a terminal portion 34a. FIG. 10 is a schematic sectional view showing a state in which the rectangular coil unit 10 has been inserted into the stator core 31.

Each of the rectangular coil units 10 or each of the tapered coil units 20 is inserted into a corresponding one of the teeth portions 33 with which the stator core 31 is equipped. In FIG. 6, the rectangular coil unit 10 is about to be inserted into the teeth portion 33 formed on the stator core 31. In this case, the body 11a of the rectangular coil frame body 11 of the rectangular coil unit 10 is formed such that a height distance Y1 corresponding to a distance from an inner peripheral upper face 11aa to an inner peripheral lower face 11ab as shown in FIG. 2 sufficiently surpasses a height of the teeth portion 33. On the other hand, the body 11a is formed with a width distance X1 so dimensioned as not to cause backlash with respect to the teeth portion 33.

This is because of a circumstance where each of the laminated steel plates forming the stator core 31 is formed through press molding and a teeth width X2 can therefore be formed with accuracy, but it is difficult to ensure the accuracy of a teeth height Y2 due to the formation of the stator core 31 through the lamination of the steel plates.

In order to prevent the steel plates of the stator core 31 from peeling off, the rectangular coil unit 10 is inserted at such a position that the body 11a is out of contact with a core upper face 31a or a core lower face 31b. In fact, as shown in FIG. 7, the lead wire 12a is guided using a guide jig 40. In FIGS. 6, 8, and 9, however, the guide jig 40 is omitted for convenience of illustration. The guide jig 40 is provided, in a region thereof into which the lead wire 12a is inserted, with a taper 41, and the lead wire 12a is so guided as to enter the terminal portion 34a. The lead wire 12a is then inserted as shown in FIG. 8. As shown in FIG. 9, as soon as the lead wire 12a enters the terminal portion 34a, the rectangular coil unit 10 is further inserted while being pressurized from above toward the core upper face 31a side by coil unit pressurization means 50.

A pressurization force of several tens of kilograms is sufficient to pressurize the rectangular coil unit 10 by the coil unit pressurization means 50. The rectangular coil unit 10 is pressurized by a thrust of a cylinder or the like. The pressurization means can also be replaced by a thrust of a motor or the like, or means employing a cam or the like. However, the coil unit pressurization means 50 needs to be so provided as not to interfere with the guide jig 40, and is therefore desired to have a compact construction. Then, as soon as the lead wire 12a is inserted into the terminal portion 34a as shown in FIG. 10 and the rectangular coil unit 10 is disposed at a predetermined position, the guide jig 40 recedes. The terminal portion 34a is then caulked, and the lead wire 12a is connected to the terminal portion 34a.

Since the stator 30 according to this embodiment of the invention is manufactured through the aforementioned method, effects described below are obtained. First of all, the dispersion of a mounting position of the lead wire 12a and the terminal portion 34a can be reduced. In the mounting method of the stator 30 described in this embodiment of the invention, each of the rectangular coil units 10 or the tapered coil units 20 as the concentrated winding coil unit formed by winding the conductor wire 12 around the rectangular coil frame body 11 or the tapered coil frame body 21 in advance is inserted into the stator core 31 formed of the laminated steel plates, and the lead wire 12a protruding from each of the rectangular coil units 10 or the tapered coil units 20 is inserted into and mounted on the terminal portion 34a provided on the stator core 31. In this method, the lead wire 12a is passed through the lead wire pullout portion 11d provided at a predetermined position of the rectangular coil frame body 11 or the lead wire pullout portion 21d provided at a predetermined position of the tapered coil frame body 21. The height from the inner peripheral upper face 11aa of the rectangular coil frame body 11 or an inner peripheral upper face 21aa of the tapered coil frame body 21 to the lead wire pullout portion 11d or the lead wire pullout portion 21d is equalized with the distance from the core upper face 31a as the upper face of the frame body insertion portion of the stator core 31 to a lead wire insertion position inner peripheral lower face 12b of the terminal portion 34a. The core upper face 31a of the stator core 31 is held in contact with the inner peripheral upper face 11aa of the rectangular coil frame body 11 or the inner peripheral upper face 21aa of the tapered coil frame body 21 after the lead wire 12a is inserted into the terminal portion 34a following the start of the insertion of the rectangular coil frame body 11 or the tapered coil frame body 21 into the stator core 31.

Figure 11:
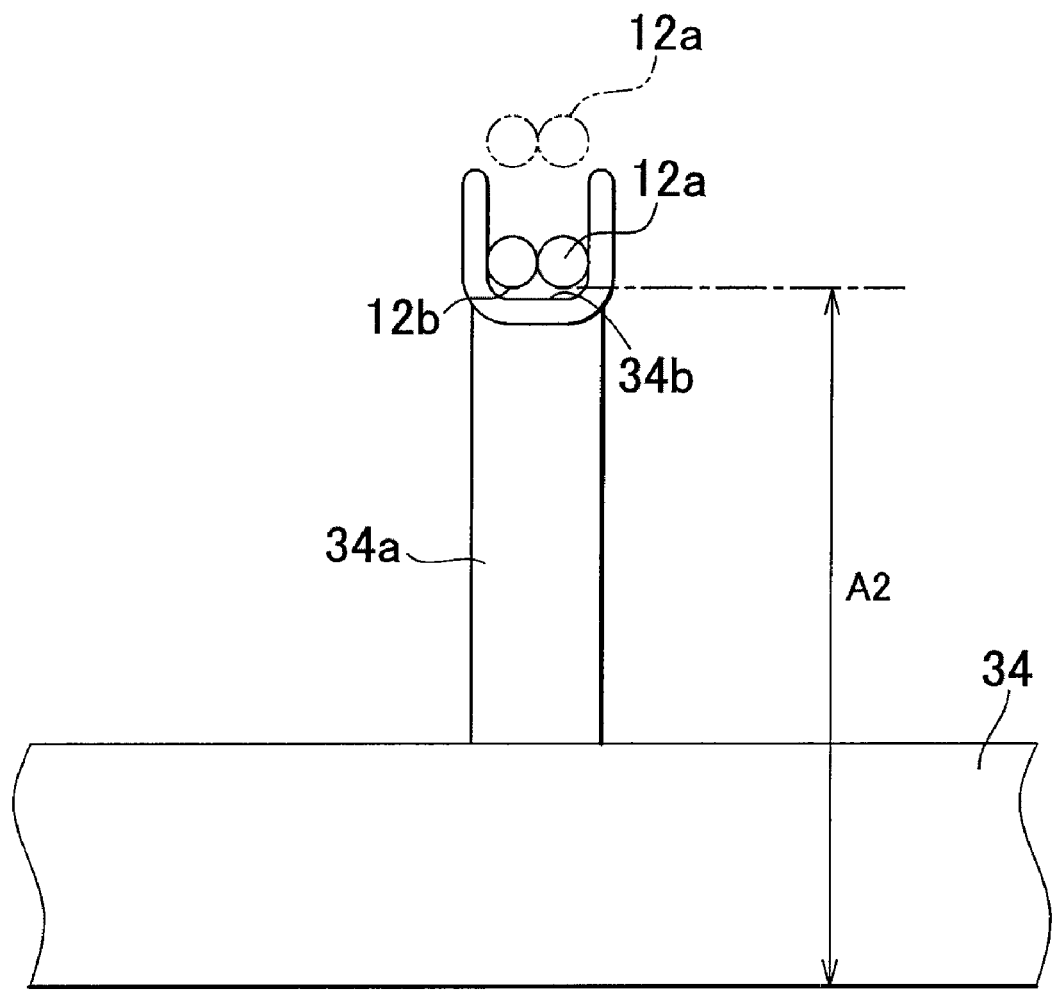
FIG. 11 is a partial front view of a bus bar according to this embodiment of the invention.

FIG. 11 is a partial front view of the bus bar 34. As shown in FIG. 8, the height of the lead wire 12a is set to the lead wire height A1, namely, the distance from the inner peripheral upper face 11aa to a lower end of the lead wire 12a. That is, this height is equal to the height from the inner peripheral upper face 11aa of the rectangular coil frame body 11 to the lead wire pullout portion 11d. On the other hand, the terminal portion 34a provided on the bus bar 34 is U-shaped as shown in FIG. 11. A U-shaped clasp lower face 34b is designed to be positioned at an ideal insertion position of the lead wire 12a.

An insertion height A2 from a lower end of the bus bar 34, namely, the core upper face 31a of the stator core 31 to the lead wire insertion position inner peripheral lower face 12b of the lead wire 12a is set in accordance with an ideal position of the lead wire 12a inserted in the terminal position 34a, and the position of the U-shaped clasp lower face 34b is set slightly lower than the position of the lead wire insertion position inner peripheral lower face 12b. The lead wire insertion position inner peripheral lower face 12b does not completely coincide in position with the U-shaped clasp lower face 34b because the dimensional tolerance of the lead wire 12a is taken into account. The lead wire height A1 and the insertion height A2 are designed to be equal to each other.

The positions of the lead wire 12a and the terminal portion 34a at the time when each of the rectangular coil units 10 or the tapered coil units 20 is mounted on the stator core 31 are set as described above. Therefore, the dispersion caused in inserting the lead wire 12a into the terminal portion 34a can be reduced by inserting the rectangular coil unit 10 into the teeth portion 33 while ensuring the urging toward the rectangular coil unit 10 by the coil unit pressurization means 50 as shown in FIG. 9.

For example, in the case where the lead wire 12a is inserted into a position indicated by alternate long and two short dashes lines in FIG. 11, the lead wire 12a needs to be pressed in from above in order to caulk the terminal portion 34a. However, when the position of the lead wire 12a is dispersed, it is difficult to reliably press the lead wire 12a into the terminal portion 34a with the aid of a device. In the case of such dispersion, the mounting operation needs to be manually performed and hence a deterioration in productivity is inevitable. Thus, the suppressed dispersion of the relative position of the lead wire 12a with respect to the terminal portion 34a makes it possible to achieve an improvement in automatic mounting properties and the enhancement of productivity.

As shown in FIG. 7, the guide jig 40 is used in mounting each of the rectangular coil units 10 on the stator 30. As described as the problem to be solved by the invention, this guide jig 40 can guide the lead wire 12a in the lateral direction owing to the taper 41, but has difficulty in guiding the lead wire 12a in the vertical direction. This is ascribable to a restriction on the positional relationship between the rectangular coil unit 10 and the terminal portion 34a, and to a circumstance in which a guide space in the height direction is difficult to ensure due to the necessity to insert the guide jig 40 into a narrow space.

Further, the guide jig 40 is required to recede in caulking the lead wire 12a and the terminal portion 34a. Thus, even when the lead wire 12a is held down by the guide jig 40 after having been inserted into the terminal portion 34a, which is so shaped as to open upward as shown in FIG. 11, there is an inconvenience in that, for example, the lead wire 12a returns to its original position due to its restoring force as a result of the recession of the guide jig 40.

As described above, even in the case it is difficult to hold the lead wire 12a in position using a device due to a geometrical restriction on the stator 30, the relative position of the lead wire 12a with respect to the terminal portion 34a is determined. Accordingly, the dispersion of the position of the tip of the lead wire 12a can be reduced by mounting the rectangular coil unit 10 while pressing the rectangular coil unit 10 with the aid of the coil unit pressurization means 50.

The invention is not limited to the foregoing embodiment thereof. The invention can also be implemented by suitably modifying part of the construction thereof without departing from the gist thereof. For example, the coil frame body and the like are changed in accordance with the design concept of the stator as well, and the shapes thereof may therefore be changed. Further, the two types of the coils, namely, the rectangular coil units and the tapered coil units are employed for the purpose of enhancing the lamination factor of the stator. However, one type of coils may be employed to manufacture the stator, or the number of the types of the coils may further be increased.

While the embodiment of the invention has been illustrated above, it is to be understood that the invention is not limited to the details of the illustrated embodiment, but may be embodied with various changes, modifications or improvements, which may occur to those skilled in the art, without departing from the spirit and scope of the invention.

What is claimed is:

1. A stator mounting method in which a concentrated winding coil unit formed by winding a conductor wire around a frame body in advance is inserted into a stator core formed of laminated steel plates, and a lead wire protruding from the concentrated winding coil unit is inserted into and mounted on a terminal portion provided on the stator core, comprising:

passing the lead wire through a lead wire pullout portion located at a predetermined position of the frame body; and making a height from an upper side of an inner peripheral face of the frame body to the lead wire pullout portion substantially equal to a distance from an upper face of a frame body insertion portion of the stator core to a lead wire insertion position inner peripheral lower face of the terminal portion, wherein a distance from the upper side of the inner peripheral face of the frame body to a lower side of the inner peripheral face of the frame body is greater than a height of a teeth portion of the stator core, and inserting the frame body into the stator core is started with the upper side of the inner peripheral face of the frame body kept out of contact with the upper face of a frame body insertion portion of the stator core, and after the lead wire is inserted into the terminal portion, the upper side of the inner peripheral face of the frame body is brought down to the upper face of the frame body insertion portion of the stator core to bring about a state where the upper face of the frame body insertion portion of the stator core and the upper side of the inner peripheral face of the frame body are in contact with each other.

2. The stator mounting method according to claim 1, wherein the frame body is pressed, when being inserted into the stator core, against the upper face side of the frame body insertion portion of the stator core with an aid of pressurization means to hold the upper face of the frame body insertion portion of the stator core in contact with the upper side of the inner peripheral face of the frame body.

* * * * *